(12) United States Patent
Luo

(10) Patent No.: US 12,433,784 B1
(45) Date of Patent: Oct. 7, 2025

(54) MOLDABLE ORAL APPLIANCE

(71) Applicant: DCSTAR INC, New York, NY (US)

(72) Inventor: David Luo, New York, NY (US)

(73) Assignee: DCSTAR INC, New York, NY (US)

( * ) Notice: Subject to any disclaimer, the term of this patent is extended or adjusted under 35 U.S.C. 154(b) by 0 days.

(21) Appl. No.: 18/777,057

(22) Filed: Jul. 18, 2024

(51) Int. Cl.
  *A61F 5/56* (2006.01)
  *A61C 7/36* (2006.01)

(52) U.S. Cl.
  CPC .............. *A61F 5/566* (2013.01); *A61C 7/36* (2013.01)

(58) Field of Classification Search
  CPC ...... A61F 2005/563; A61F 5/56; A61F 5/566; A61C 7/08; A61C 7/36; A61C 9/0006; A61C 19/06; A61C 19/063; A61C 19/066; A63B 71/085; A63B 2071/086; A63B 2071/088
  See application file for complete search history.

(56) References Cited

U.S. PATENT DOCUMENTS

| | | | | |
|---|---|---|---|---|
| 3,864,832 A | * | 2/1975 | Carlson | A61C 5/90 128/862 |
| 4,204,323 A | * | 5/1980 | Neubert | A61C 9/0006 433/48 |
| 5,733,118 A | * | 3/1998 | Pankuch | A61C 9/0006 433/37 |
| 6,170,485 B1 | * | 1/2001 | Orrico | A61F 5/566 128/862 |
| 2011/0162658 A1 | * | 7/2011 | Fisher | A61F 5/566 128/848 |

* cited by examiner

*Primary Examiner* — Camtu T Nguyen
(74) *Attorney, Agent, or Firm* — Birch, Stewart, Kolasch & Birch, LLP

(57) ABSTRACT

A moldable oral appliance, comprising an upper tray assembly and a lower tray assembly. The upper tray assembly is configured to have an upper moldable component and an upper frame. The lower tray assembly includes a lower moldable component and a lower frame. The upper moldable component and the lower moldable component are made of a moldable material that is deformable when heated. The upper frame and the lower frame do not deform when heated to the temperature required for deforming the upper and lower moldable components. The upper moldable component and the lower moldable component each have at least one groove.

21 Claims, 14 Drawing Sheets

MOLDABLE ORAL APPLIANCE

TECHNICAL FIELD

The present disclosure relates to oral appliances, particularly to a device for preventing, reducing, or eliminating snoring and/or obstructive sleep apnea.

BACKGROUND

In modern medicine, sleep problems have become a prominent health concern. Snoring and obstructive sleep apnea are two common sleep disorders that not only affect the quality of sleep for patients but also potentially lead to a series of health issues. Meanwhile, the technology in the field of oral appliances is continuously evolving, providing new treatment options to address these sleep problems.

Snoring is the noise produced during sleep due to the obstruction of airflow caused by the relaxation of tissues in the throat. During sleep, tissues such as the tongue and soft palate may collapse, leading to a narrowed airflow passage, which causes vibrations and generates the harsh sound of snoring. This phenomenon can not only disrupt the sleep of the patient but also affect the sleep of roommates or family members. Obstructive sleep apnea is more severe, resulting from partial or complete blockage of the throat, leading to interruptions in airflow and causing breathing pauses. This condition causes repeated breathing stoppages during sleep, severely affecting oxygen supply, which may lead to a drop in blood oxygen levels and further damage to the cardiovascular system and brain.

To address sleep problems like snoring and obstructive sleep apnea, various preventive and treatment methods are currently available. Oral appliances are considered one of the effective options. One common type of oral appliance is the Mandibular Advancement Device (MAD). This device works by advancing the lower jaw relative to the upper jaw to increase airflow through the throat, thereby reducing or eliminating snoring and obstructive sleep apnea. In addition to MADs, Tongue Retaining Devices (TRDs) and Tongue Stabilizing Devices (TSDs) are also common oral appliances. They support the position of the tongue to maintain an open airway, thereby reducing the occurrence of sleep apnea.

In addition to traditional oral appliances, advancements in modern technology have brought new options for the treatment of sleep disorders. Smart oral appliances, which integrate sensor technology and data analysis, can monitor the user's sleep in real time and adjust the usage of the appliance as needed, providing personalized treatment plans. Furthermore, the application of 3D printing technology offers a more precise method for customizing oral appliances, making them better fit the user's oral anatomy and improving comfort and treatment efficacy.

Despite the continuous progress in oral appliance technology, several challenges remain. Some users may find it difficult to adapt to using the appliance, which can affect the treatment's effectiveness; others may experience discomfort or issues with occlusion while using the appliance. Additionally, the cost of using these appliances is another factor that users consider when deciding whether to continue their use.

SUMMARY

Based on this, to address the above-mentioned shortcomings, an effective, comfortable, and affordable moldable oral appliance is provided.

This disclosure provides a moldable oral appliance, which comprises an upper tray assembly configured to be positioned on a user's upper dental arch, and a lower tray assembly configured to be positioned on the user's lower dental arch. The upper tray assembly includes an upper moldable component and an upper frame, while the lower tray assembly includes a lower moldable component and a lower frame. The upper moldable component and the lower moldable component include a moldable material that is deformable when heated, and the upper frame and the lower frame do not deform when heated to a temperature required for deforming the upper moldable component and the lower moldable component. In addition, the upper moldable component and the lower moldable component each have at least one groove, and the at least one groove includes a first groove. The first groove having a front wall and a rear wall, and a distance between the front wall and the rear wall is at least partially variable.

In one embodiment, the upper moldable component and the lower moldable component are made of medical-grade moldable material.

In one embodiment, the upper moldable component and the lower moldable component do not damage their material or performance during a deformation process.

In one embodiment, the upper moldable component and the lower moldable component are configured to allow slight elastic deformation while maintaining their molded shape.

In one embodiment, a width in a middle of the first groove is less than a width at both sides of the first groove.

In one embodiment, a height in the middle of the first groove is greater than a height at both sides of the at least one first groove.

The disclosure discussed herein provides another moldable oral appliance, which comprises an upper tray assembly configured to be positioned on a user's upper dental arch, and a lower tray assembly configured to be positioned on the user's lower dental arch. The upper tray assembly includes an upper moldable component and an upper frame, whereas the lower tray assembly includes a lower moldable component and a lower frame. The upper moldable component and the lower moldable component include a moldable material that is deformable when heated, and the upper frame and the lower frame do not deform when heated to a temperature required for deforming the upper moldable component and the lower moldable component. The upper moldable component and the lower moldable component each have at least one first groove. In addition, the upper moldable component and the lower moldable component each have at least one second groove in any cross-section perpendicular to the horizontal plane, the at least one second groove being configured to prevent the upper moldable component and the lower moldable component from overflowing a defined range during a heating and molding process.

In one embodiment, the upper moldable component and the lower moldable component are at least partially made of a flexible thermoplastic material.

In one embodiment, the upper frame and the lower frame are at least partially made of a relatively rigid material compared to the upper moldable component and the lower moldable component to ensure structural stability and support of the oral appliance.

In one embodiment, the at least one first groove is configured to accommodate the user's teeth.

In one embodiment, the upper moldable component and the lower moldable component do not produce harmful substances or odors during the heating and molding process.

This disclosure provides yet another moldable oral appliance. The moldable oral appliance comprises an upper tray assembly configured to be positioned on a user's upper dental arch, and a lower tray assembly configured to be positioned on the user's lower dental arch. The upper tray assembly includes an upper moldable component and an upper frame, while the lower tray assembly includes a lower moldable component and a lower frame. The upper moldable component and the lower moldable component include a moldable material that is deformable when heated, and the upper frame and the lower frame do not deform when heated to a temperature required for deforming the upper moldable component and the lower moldable component. The upper moldable component and the lower moldable component each have at least one groove. In addition, a projected area of the upper moldable component on a horizontal plane is larger than a projected area of the upper frame on the horizontal plane. Similarly, a projected area of the lower moldable component on a horizontal plane is larger than a projected area of the lower frame on the horizontal plane.

In one embodiment, a height of at least a portion of the upper moldable component and the lower moldable component is between 0.5 mm and 30 mm.

In one embodiment, the upper frame and the lower frame each have an outer wall, and the upper moldable component and the lower moldable component at least partially cover tops of the outer walls on the upper frame and the lower frame.

In one embodiment, a height of the upper moldable component and the lower moldable component covering the tops of the outer walls on the upper frame and the lower frame is between 0 mm and 30 mm.

In one embodiment, a width of the upper moldable component and the lower moldable component covering the tops of the outer walls on the upper frame and the lower frame is between 0 mm and 10 mm.

This disclosure further provides another moldable oral appliance. The moldable oral appliance comprises an upper tray assembly configured to be positioned on a user's upper dental arch, and a lower tray assembly configured to be positioned on the user's lower dental arch. The upper tray assembly includes an upper moldable component and an upper frame, and the lower tray assembly includes a lower moldable component and a lower frame. In the meantime, the upper moldable component and the lower moldable component include a moldable material that is deformable when heated, and the upper frame and the lower frame do not deform when heated to a temperature required for deforming the upper moldable component and the lower moldable component. The upper moldable component and the lower moldable component each have at least one first groove, and the upper moldable component and the lower moldable component each have at least one second groove.

The upper moldable component and the lower moldable component have one or more of the following characteristics:
  A. The at least one first groove has a bottom wall, and a vertical distance between the at least one bottom wall and the upper frame and/or the lower frame is between 1 mm to 15 mm;
  B. The at least one second groove has a bottom wall, and a vertical distance between the at least one bottom wall and the upper frame and/or the lower frame is between 0.5 mm to 15 mm;
  C. A projected area of the at least one first groove on a horizontal plane occupies 10% to 90% of a projected area of the upper moldable component and/or the lower moldable component on the horizontal plane.

In one embodiment, the at least one second groove has a front wall and a rear wall, and a distance between the front wall and the rear wall is between 0.1 mm to 10 mm.

In one embodiment, a height of a middle portion of the upper moldable component and the lower moldable component is greater than a height at both ends of the upper moldable component and the lower moldable component.

In one embodiment, a shape of the upper tray assembly is configured to conform to an approximate arch shape of the user's upper dental arch.

In one embodiment, a shape of the lower tray assembly is configured to conform to an approximate arch shape of the user's lower dental arch.

The moldable oral appliance of the present disclosure has at least the following beneficial effects:
  (1) The moldable components are made of flexible thermoplastic material, providing excellent adaptability to the user's oral anatomy. The design of the moldable components covers most areas of the oral appliance, especially areas prone to cause abrasion in the mouth. This design effectively reduces friction between the oral appliance and oral tissues, making the user feel more comfortable during wear.
  (2) The moldable components are configured to have a first groove and a second groove, aimed at providing superior molding effects during the heating and shaping process. During heating and shaping, the first groove accommodates the user's teeth. When the user bites to shape, the molding material of the front wall and rear wall of the first groove is compressed, causing excess material to move towards the side away from the teeth. Excess material may overflow the boundaries of the oral appliance, reducing its adaptability and wearing comfort. The second groove effectively solves this problem by being positioned in the path of the excess material. During compression, the excess material flows into the second groove, thereby controlling the flow of the molding material and preventing overflow during the shaping process. This design not only enhances the fit and comfort of the oral appliance but also reduces material waste, providing a higher quality user experience. Additionally, this design makes the production process of the oral appliance more economical and environmentally friendly.
  (3) The moldable component includes a first groove, which is centrally located and configured to accommodate the user's teeth. Considering the variations in tooth sizes, the distance between the front and rear walls of the groove is adjusted accordingly. Incisors are typically narrower and thinner, suitable for cutting and tearing food, whereas molars are usually wider and thicker, better suited for chewing and grinding food. Additionally, there are differences between the upper and lower dental arches. Therefore, the dimensions of the first groove are set to fit different tooth shapes: the width in the middle (incisor position) is smaller than the width on the sides (molar position), and the height in the middle (incisor position) is greater than the height on the sides (molar position). This design helps the oral appliance better conform to the user's teeth, making the shaping process more straightforward and accurate for the user.
  (4) The height of the moldable component varies at different positions, a design that takes into account the curved characteristics of the oral structure. Consequently, it includes height differences in its shape. Similarly, the overall shape of the tray assembly also considers the curved characteristics of the oral structure and is provided with height differences. As part of the tray assembly, the overall shape of the moldable component is adapted to the height differences of the tray assembly to ensure a better fit between the oral appliance and the user's teeth and oral structure, providing enhanced comfort and user experience. During biting, the moldable component can form a tighter contact with the teeth and oral structure, significantly improving the fit of the oral appliance. This design not only enhances the adaptability and fit of the oral appliance but also makes the user's bite molding process more convenient. Moreover, as this design improves the adaptability and fit of the oral appliance, it enhances the comfort for the user and thereby improves the treatment efficacy and user experience.

(5) The moldable component is made of a flexible material, which adapts more easily to the oral anatomy compared to the frame, reducing irritation and abrasion to the soft tissues of the mouth. Therefore, setting the projected area of the moldable component on the horizontal plane to be larger than that of the frame can decrease the contact pressure of the oral appliance on the soft tissues of the mouth, further reducing the risk of abrasion. Additionally, considering the variation in the distance from the inside of the lips to the back of the molar region among different users, the design of the oral appliance allows the user to trim the length to fit this distance. The soft moldable component enables users to easily trim and adjust the device length according to personal needs, thus enhancing comfort and personalized adaptability. Notably, since the projected area of the moldable component on the horizontal plane is larger than that of the frame, trimming does not affect the structure and function of the frame, ensuring the stability of the oral appliance.

DETAILED DESCRIPTION

To make the objectives, features, and advantages of the present disclosure more clear and understandable, detailed descriptions of specific embodiments of the disclosure are provided below in conjunction with the accompanying drawings. Numerous specific details are set forth in the following description to provide a thorough understanding of the disclosure. However, the disclosure can be implemented in many different ways other than those described herein, and those skilled in the art can make similar modifications without departing from the scope of the disclosure. Therefore, the disclosure is not limited to the specific embodiments disclosed below.

The present disclosure relates to an oral appliance 1, particularly a device for preventing, reducing, or eliminating snoring and/or obstructive sleep apnea. In certain embodiments, the appliance can also serve as a sports mouthguard for the upper dental arch, lower dental arch, or both dental arches. In some embodiments, the appliance can also be used as a bruxism guard for the upper dental arch, lower dental arch, or both dental arches.

The present disclosure provides an effective, comfortable, and affordable moldable oral appliance 1.

Figure 1:
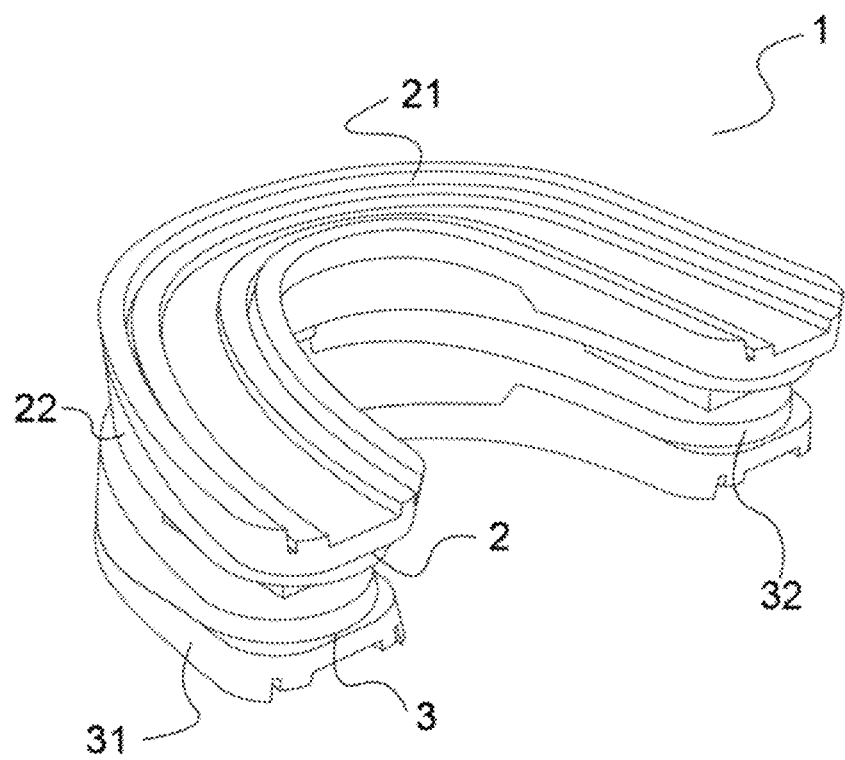
FIG. 1 is a general schematic diagram of an oral appliance according to an embodiment of the present disclosure.
Figure 2:
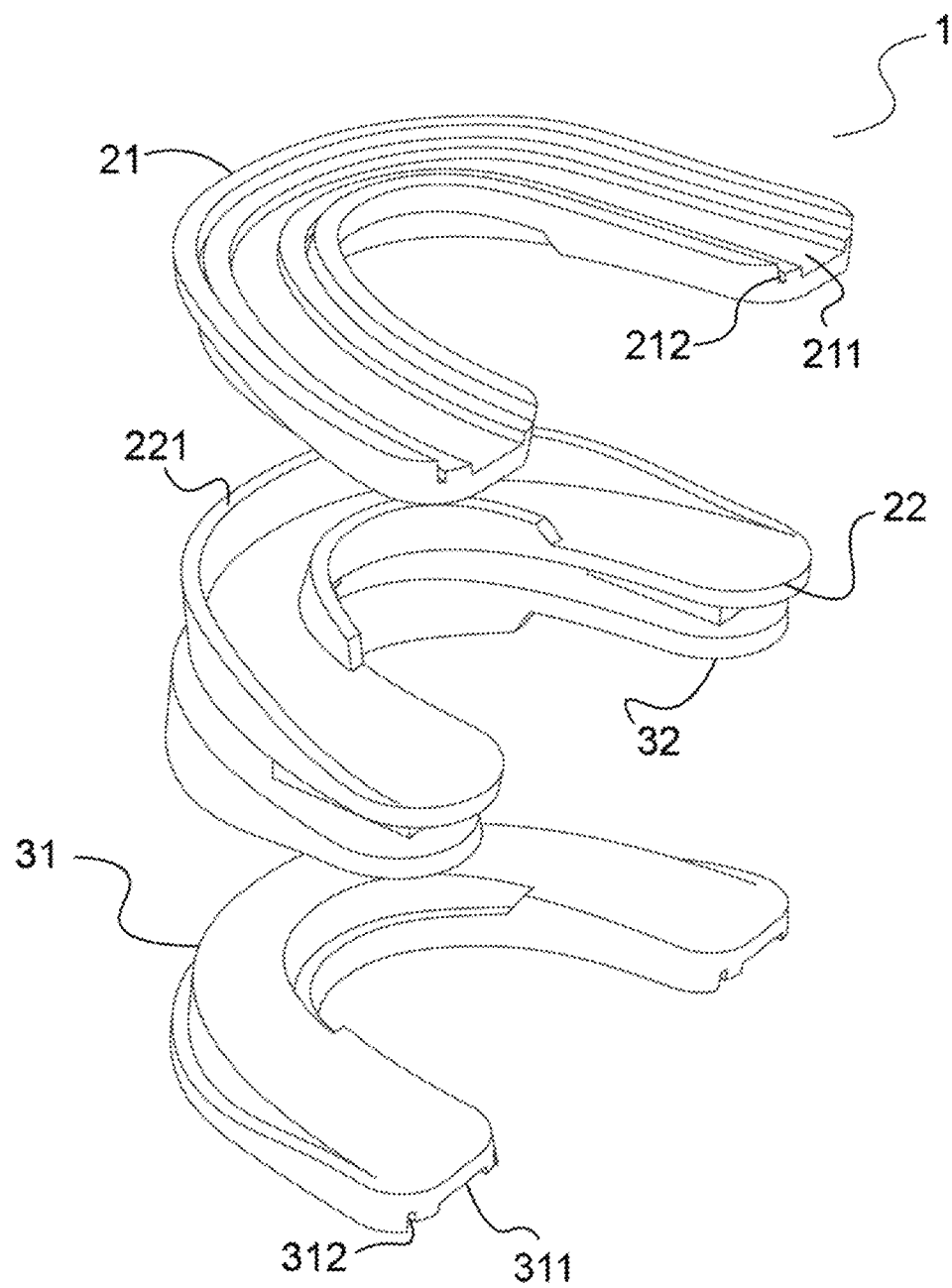
FIG. 2 is an exploded structural schematic diagram of an oral appliance according to multiple embodiments of the present disclosure.
Figure 3:
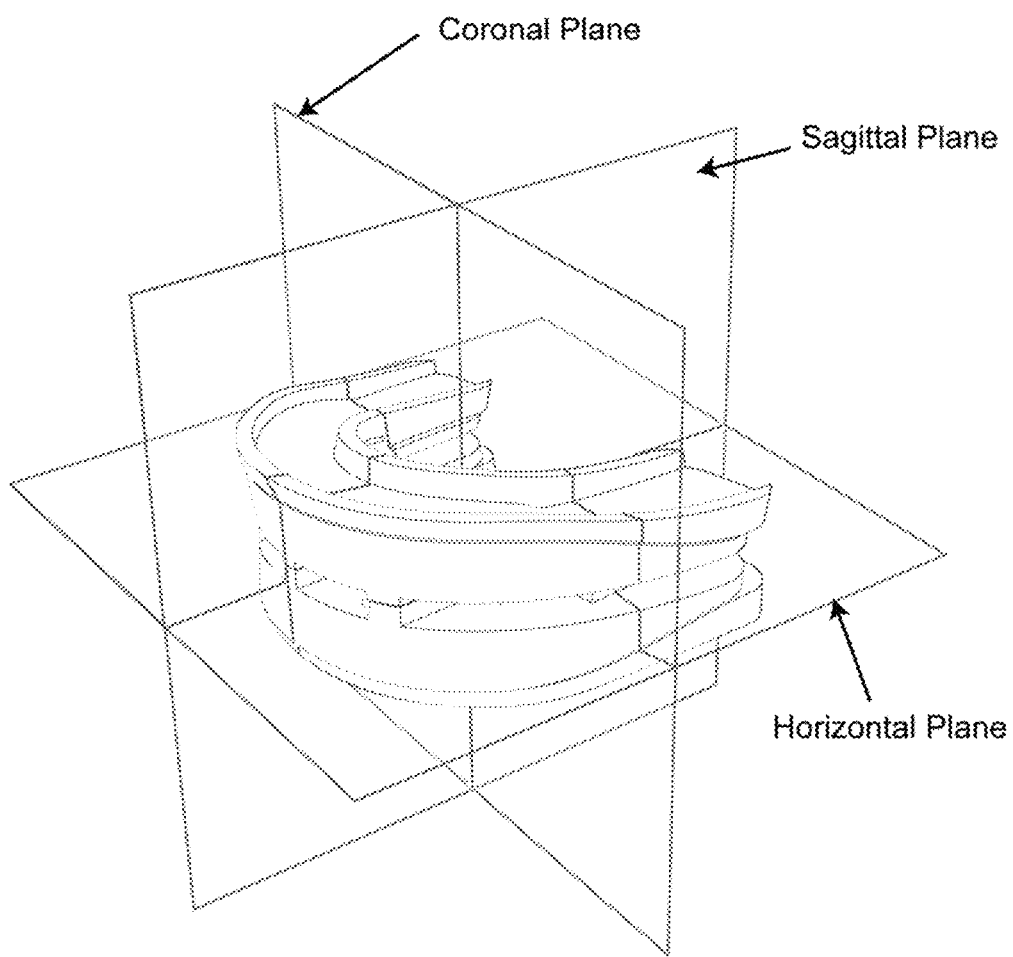
FIG. 3 is a schematic diagram of the horizontal plane, sagittal plane, and coronal plane according to multiple embodiments of the present disclosure.

Specifically, with reference to FIGS. 1 to 3, the oral appliance 1 of the present disclosure includes an upper tray assembly 2 and a lower tray assembly 3, wherein the upper tray assembly 2 is configured to be positioned on the user's upper dental arch, and the lower tray assembly 3 is configured to be positioned on the user's lower dental arch. The tray assemblies 2 and 3 are configured to match the shape and structure of the user's dental arches, providing sufficient support and stability for the oral appliance 1. Therefore, the shapes of the upper and lower tray assemblies 2 and 3 are configured to conform to the approximate arch shape of the user's dental arches, to better fit the user's upper and lower teeth.

The upper tray assembly 2 includes an upper moldable component 21 and an upper frame 22, while the lower tray assembly 3 includes a lower moldable component 31 and a lower frame 32. In the present disclosure, the tray assemblies 2 and 3 include an upper tray assembly 2 and a lower tray assembly 3, the frames 22 and 23 include an upper frame 22 and a lower frame 32, and the moldable components 21 and 31 include an upper moldable component 21 and a lower moldable component 31. The material selection for the tray assemblies 2 and 3 is broad, including plastics or polymer materials suitable for oral medical devices and capable of being molded. These materials include but are not limited to polypropylene (PP), polycarbonate (PC), polyethylene terephthalate (PET), polymethyl methacrylate (PMMA), polyphenylsulfone (PPSU), polyethylene (PE), high-density polyethylene (HDPE), low-density polyethylene (LDPE), ethylene-vinyl acetate (EVA), thermoplastic polyurethane (TPU), styrene-ethylene-butylene-styrene (SEBS), styrene-ethylene-propylene-styrene (SEPS), and silicone rubber. These materials have good biocompatibility, mechanical properties, and processing performance, making them suitable for the manufacture of the oral appliance 1. The various parts of the upper and lower tray assemblies 2 and 3, such as the moldable components 21 and 31 and the frames 22 and 32, can be made from a single material or a combination of multiple materials. This multi-material design can fully utilize the characteristics of different materials to meet the various requirements of the oral appliance 1 during use. A multi-layer structure can also be used, where each layer may be made of the same or different materials, optimizing the configuration of material properties. Polymer materials may contain various fillers, plasticizers, pigments, and other additives to meet different performance requirements and manufacturing needs. For example, nanoscale fillers can be added to enhance the strength and hardness of the material, or antimicrobial agents can be added to improve the hygiene performance of the oral appliance. Suitable types of polymer materials include thermoplastics, thermosetting polymers, elastomers, and thermoplastic elastomers. These materials can be copolymers, terpolymers, or mixtures of different types of polymers, such as mixtures of thermoplastics with different molecular weights, all of which have good processing and mechanical properties, making them suitable for the manufacture of the oral appliance 1.

The upper moldable component 21 and the lower moldable component 31 are made of moldable materials, preferably thermoplastic plastics, allowing the user to adjust the fit of the oral appliance 1 through heating and molding. The heating and molding method uses the "boil and bite" technique, which is simple and easy to perform. The user only needs to place the oral appliance 1 in hot water to heat it and then gently bite the appliance 1 with their mouth to mold it to fit their teeth. As the upper moldable component 21 and the lower moldable component 31 include a moldable material, which is deformable when heated. The upper frame 22 and the lower frame 32 do not deform at the temperature required to mold the upper moldable component 21 and the lower moldable component 31. This design ensures the stability and reliability of the oral appliance 1 during the molding process, allowing the user to easily adjust the fit and achieve a better user experience.

It is worth noting that if the frames 22 and 32 are also made of thermoplastic plastic, their deformation temperature will be higher than that of the moldable components 21 and 31. This ensures that the frames 22 and 32 are not affected during the heating and molding process. Additionally, since the different parts of the oral appliance 1 have different functions, care must be taken during the heating and molding process to avoid affecting their original functions. By maintaining the stability and shape of the frames 22 and 32, even when the moldable components 21 and 31 are being molded, the basic functions of the oral appliance 1 are preserved. This design takes into account the characteristics of the different components, ensuring the smooth progress of the heating and molding process and the reliability and stability of the final result.

Additionally, there are specific requirements for the material selection of the upper moldable component 21 and the lower moldable component 31. Firstly, medical-grade moldable materials are used, meeting medical-grade standards to ensure the safety and reliability of the oral appliance 1. Secondly, the moldable components 21 and 31 must not suffer damage to their material or performance during the deformation process. This means that during the heating and molding process, the materials must withstand high temperatures without cracking or degrading, to ensure the quality and stability of the oral appliance 1. Moreover, the moldable components 21 and 31 must not produce harmful substances or odors during the deformation process, ensuring user safety and comfort. Lastly, the moldable components 21 and 31 should allow slight elastic deformation while maintaining their molded shape. The moldable components 21 and 31 are at least partially made of flexible thermoplastic materials. After heating and molding, these components are shaped to conform to the shape of the teeth and maintain the molded shape. Additionally, due to the properties of the flexible thermoplastic materials used, during wear, if the user applies biting force, the material exhibits a certain degree of elasticity and toughness, allowing the moldable components 21 and 31 to undergo slight elastic deformation to accommodate the biting force of the teeth. This deformation does not lead to a complete change in the molded shape but rather makes wearing more comfortable while ensuring the stability and adaptability of the moldable components 21 and 31.

Figure 5:
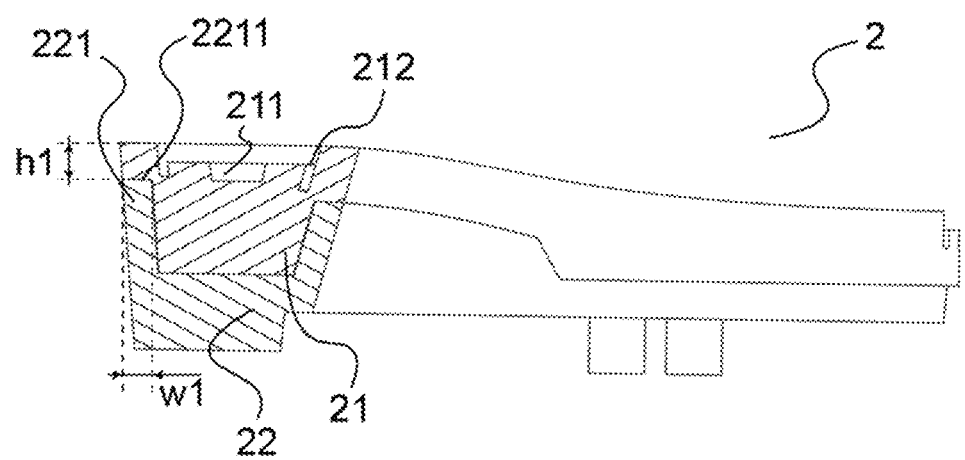
FIG. 5 is a cross-sectional view of the upper tray assembly along the direction A-A in FIG. 4 according to an embodiment of the present disclosure.
Figure 6:
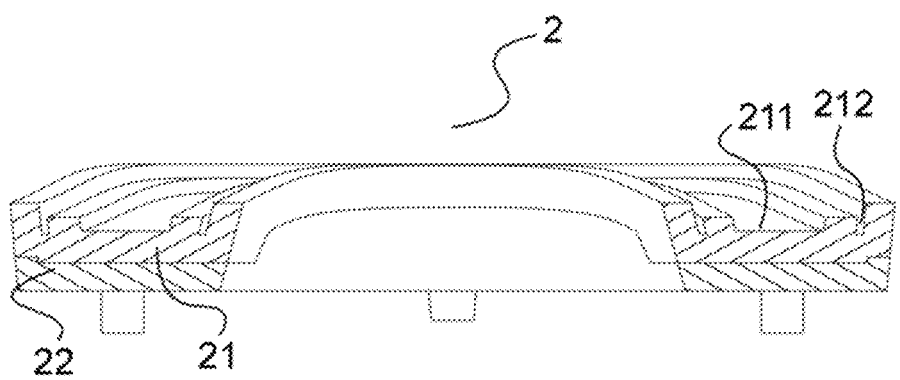
FIG. 6 is a cross-sectional view of the upper tray assembly along the direction B-B in FIG. 4 according to an embodiment of the present disclosure.

The height of the moldable components 21 and 31 varies at different positions, as shown in FIGS. 5 and 6. The overall height of the moldable components 21 and 31 is between 0.5 mm to 30 mm, with the height in the middle (incisor position, as shown in FIG. 5) being greater than the height at both ends (molar position, as shown in FIG. 6). This design considers the curved characteristics of the oral structure, resulting in height differences in the shape. Similarly, the overall shapes of the upper tray assembly 2 and the lower tray assembly 3 also take into account the curved characteristics of the oral structure, incorporating height differences accordingly. As part of the upper tray assembly 2 and the lower tray assembly 3, the overall shapes of the moldable components 21 and 31 are adapted to the height differences of the upper tray assembly 2 and the lower tray assembly 3. This ensures a better fit between the oral appliance 1 and the user's teeth and oral structure, providing enhanced comfort and user experience. During the user's biting down, the moldable components 21 and 31 can form a tighter contact with the teeth and oral structure, significantly improving the fit of the oral appliance 1. Additionally, this design facilitates easier biting for the user. The design not only enhances the adaptability and fit of the oral appliance 1 but also improves the comfort of wearing the oral appliance 1, thereby enhancing treatment effectiveness and user experience.

The frames 22 and 32 are at least partially made of a relatively more rigid material compared to the moldable components 21 and 31 to ensure the structural stability and support of the oral appliance 1. This design provides the necessary stability and support for the oral appliance 1, ensuring that it does not deform or become loose during use, thereby maintaining its stability and functionality. This design keeps the overall structure of the oral appliance 1 stable while providing sufficient support, allowing the user to comfortably use the oral appliance 1.

Figure 4:
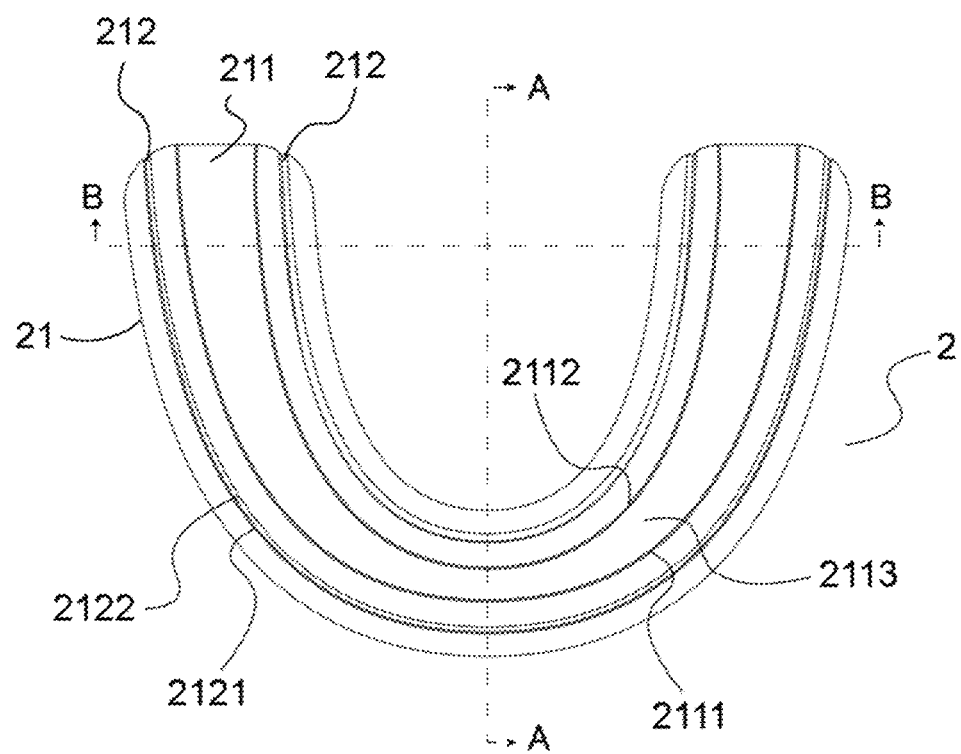
FIG. 4 is a top view of the upper tray assembly according to an embodiment of the present disclosure.

As shown in FIGS. 4 and 5, the frames 22 and 32 have at least one outer wall 221. When wearing the oral appliance 1, the upper and lower tops are the parts most likely to come into contact with the inside of the mouth, which could cause abrasion if covered by a more rigid frame. Therefore, in the present disclosure, the moldable components 21 and 31 partially cover the top 2211 of the at least one outer wall 221 of the frames. The width of the moldable components 21 and 31 partially covering the top 2211 of the at least one outer wall 221 is between 0 to 10 mm, as shown by w1 in FIG. 5, and the height of the moldable components 21 and 31 partially covering the top 2211 of the at least one outer wall 221 is between 0 to 30 mm, as shown by h1 in FIG. 5. The moldable components 21 and 31 are made of flexible thermoplastic material, providing excellent adaptability to effectively conform to the user's oral anatomy. Their design covers most areas of the oral appliance 1 that come into contact with the oral cavity, particularly areas prone to abrasion. This design effectively reduces friction between the oral appliance 1 and the oral tissues, making the user feel more comfortable during wear.

Figure 7:
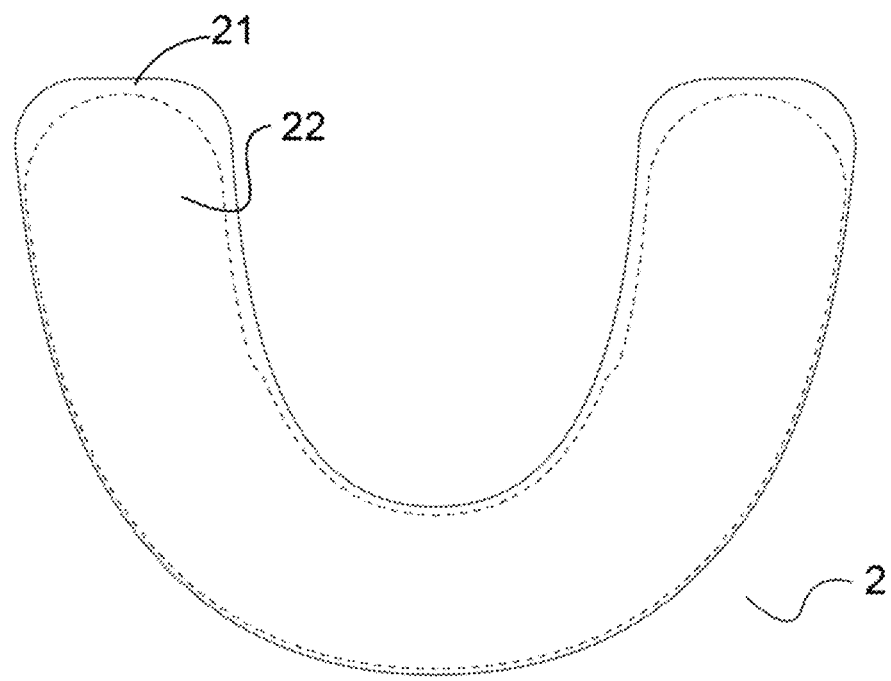
FIG. 7 is a schematic diagram of the horizontal projection plane of the upper moldable component and the upper frame according to an embodiment of the present disclosure.
Figure 8:
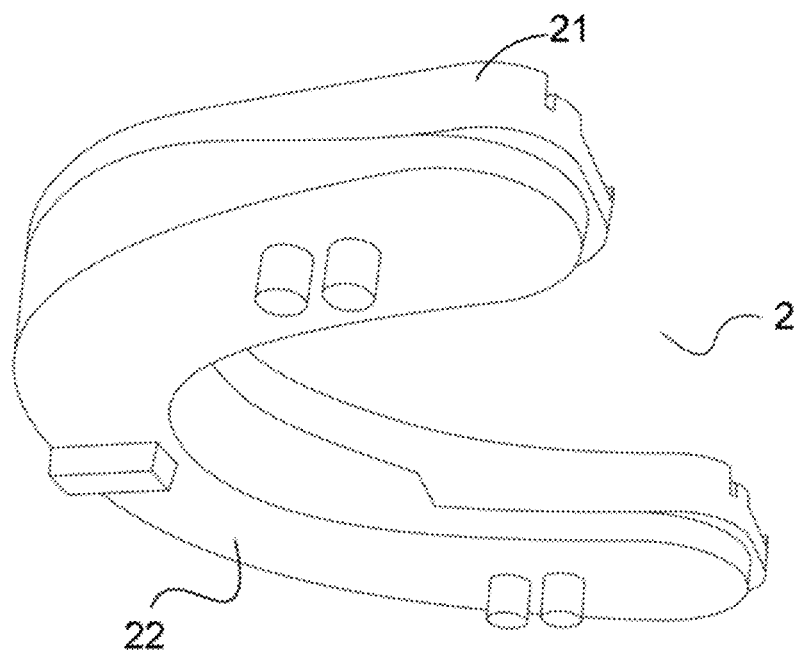
FIG. 8 is a side view of the upper tray assembly according to an embodiment of the present disclosure.

As shown in FIGS. 7 and 8, the projected area of the upper moldable component 21 on the horizontal plane (i.e., the plane perpendicular to the sagittal and coronal planes) is larger than the projected area of the upper frame 22 on the horizontal plane. Similarly, the projected area of the lower moldable component 31 on the horizontal plane is larger than the projected area of the lower frame 32 on the horizontal plane. The transverse width of the upper tray assembly 2 and the lower tray assembly 3 on the horizontal plane (i.e., the width between the sides of the tray assembly 2 and the tray assembly 3 facing the user's cheeks) is between 25 to 75 mm, and the longitudinal length (i.e., the length from the end of the tray assembly 2 and the tray assembly 3 facing the user's incisors to the end facing the user's temporomandibular joint) is between 20 to 80 mm. The design of the moldable component 21 and the moldable component 31 having a larger projected area on the horizontal plane than the frame 22 and the frame 32 is based on the following considerations: Firstly, the moldable component 21 and the moldable component 31 are made of flexible material, making them more adaptable to the oral anatomy, thus reducing irritation and abrasion to the oral soft tissues. Secondly, because the projected area of the moldable component 21 and the moldable component 31 is larger, the contact pressure on the oral soft tissues is reduced, further minimizing the risk of abrasion. Additionally, considering the variation in the distance from the inner side of the lips to the area behind the molars among different users, an overly long device may cause abrasion to the oral tissues behind the molars, especially in the joint area, and an ill-fitting device may affect occlusal function. The design of the oral appliance 1 in this embodiment allows users to adjust the length by trimming to fit the distance from the inner side of the lips to the area behind the molars. The soft moldable component 21 and moldable component 31 enable users to easily trim and adjust the device length according to personal needs, enhancing comfort and personalized adaptability. It is important to emphasize that since the projected area of the moldable component 21 and the moldable component 31 on the horizontal plane is larger than that of the frame 22 and the frame 32, trimming will not affect the frame 22 and the frame 32, thus ensuring the stability of the oral appliance 1. This design not only ensures the functionality of the oral appliance 1 but also provides users with greater autonomy for adjustments, making the use of the oral appliance 1 more comfortable.

As shown in FIG. 5, the moldable component 21 and the moldable component 31 each have at least one groove. The moldable component 21 and the moldable component 31 include a first grooves 211 and 311, respectively, which are centrally located on the moldable component 21 and the moldable component 31, and configured to accommodate the user's teeth. Additionally, the moldable component 21 and the moldable component 31 have at least a second groove 212 and 312, respectively, in any cross-section perpendicular to the horizontal plane. The second grooves 212 and 312 are configured to prevent the moldable component 21 and the moldable component 31 from overflowing the defined boundaries of the oral appliance 1 during the heating and molding process (the boundaries of the oral appliance 1). The first grooves 211 and 311 and the second grooves 212 and 312 in the moldable component 21 and the moldable component 31 aim to provide superior molding effects during the heating and shaping process. When heated and molded, the first grooves 211 and 311 come into contact with the user's teeth. During the bite molding process, the areas around the first grooves 211 and 311 are compressed, causing excess material to move towards the side away from the teeth. Excess material might overflow the boundaries of the oral appliance 1, reducing its adaptability and wearing comfort. The second grooves 212 and 312 effectively address this issue by being positioned in the moving path of the excess material. During compression, the excess material automatically flows into the second grooves 212 and 312, controlling the flow of the molding material and preventing it from overflowing the boundaries of the oral appliance 1 during the shaping process.

The following provides a detailed description of several structures of the oral appliance 1 according to specific embodiments of the present disclosure.

Embodiment 1

In this embodiment, the oral appliance 1 includes an upper tray assembly 2 and a lower tray assembly 3, wherein the upper tray assembly 2 is configured to be positioned on the user's upper dental arch, and the lower tray assembly 3 is configured to be positioned on the user's lower dental arch. The upper tray assembly 2 comprises an upper moldable component 21 and an upper frame 22, while the lower tray assembly 3 comprises a lower moldable component 31 and a lower frame 32. In this embodiment, the frame 22 and the frame 32 include an upper frame 22 and a lower frame 32, and the moldable components 21 and 31 include an upper moldable component 21 and a lower moldable component 31.

Figure 9:
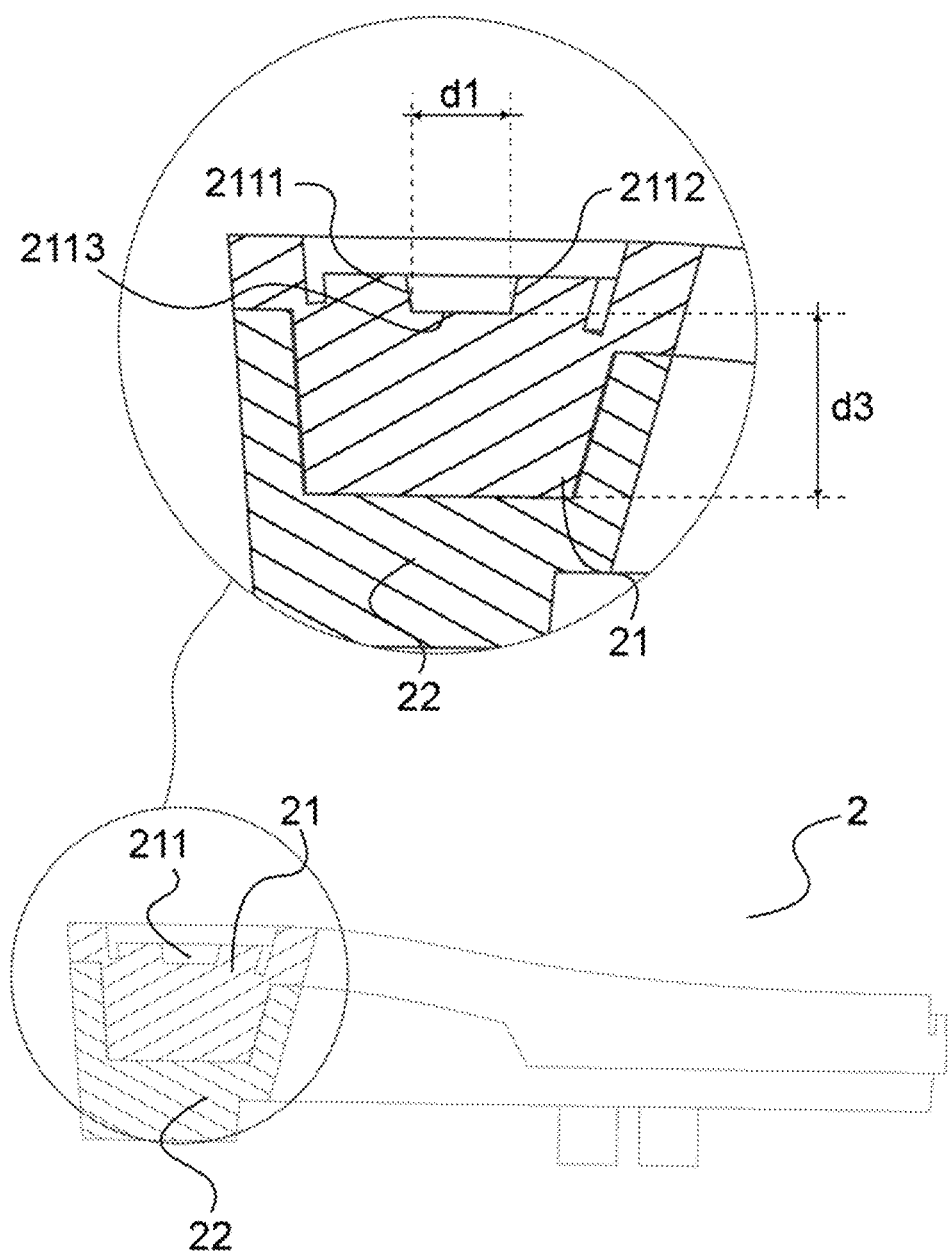
FIG. 9 is a partial cross-sectional view of the upper tray assembly according to an embodiment of the present disclosure.
Figure 10:
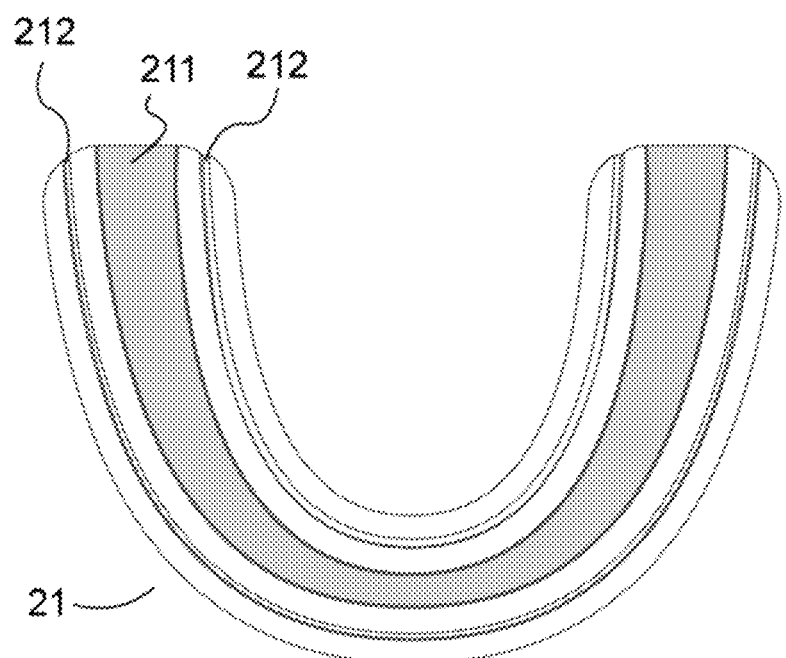
FIG. 10 is a schematic diagram of the area of the first groove of the upper moldable component on the horizontal plane according to an embodiment of the present disclosure.
Figure 11:
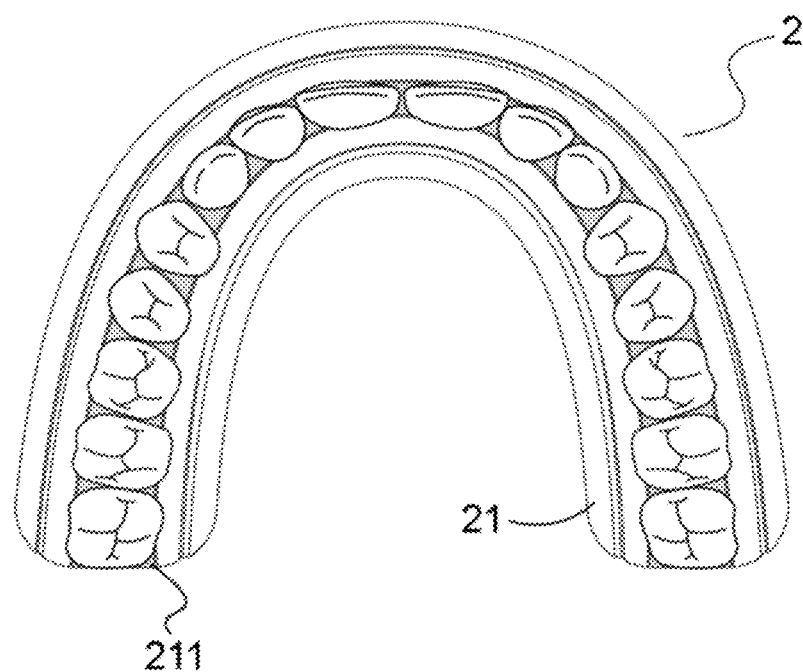
FIG. 11 is a schematic diagram of the position of the upper dental arch placed in the upper tray assembly according to an embodiment of the present disclosure.
Figure 12:
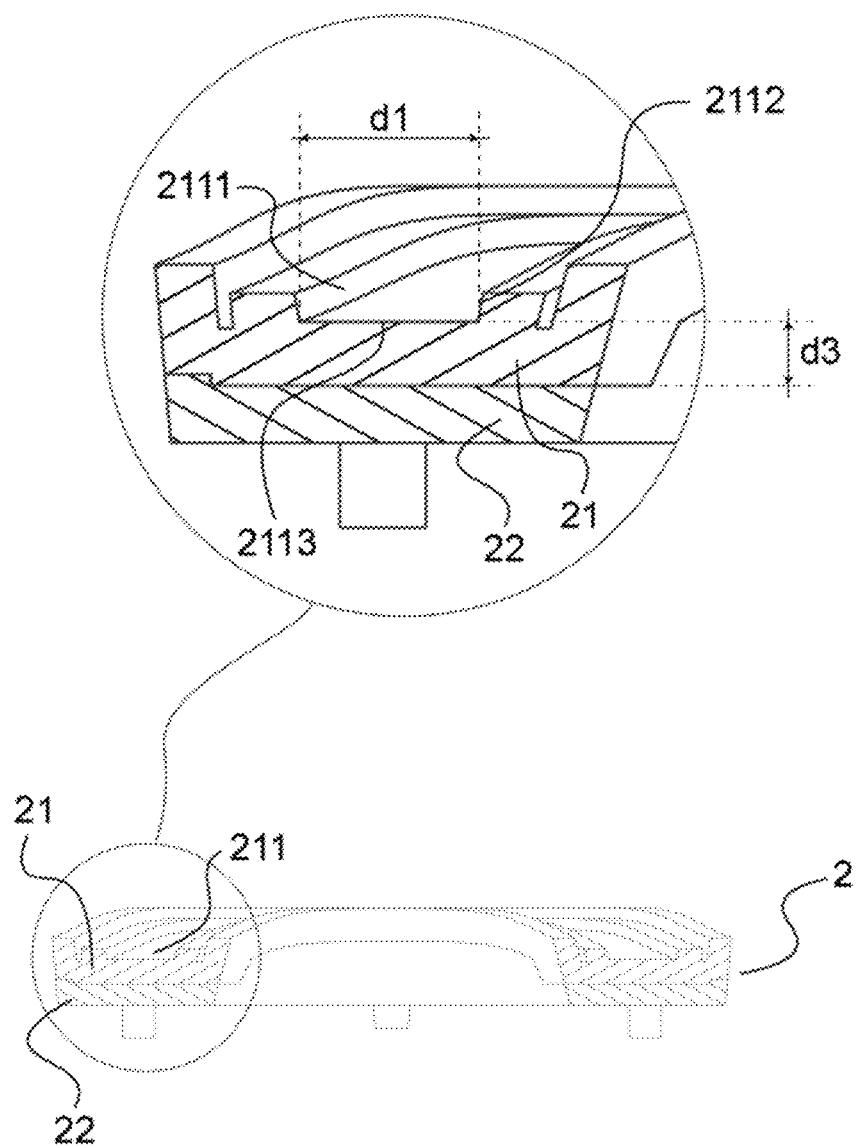
FIG. 12 is a partial cross-sectional view of the first groove in the upper tray assembly according to an embodiment of the present disclosure.

Specifically, referring to FIGS. 9 to 10, the moldable component 21 and the moldable component 31 each have at least one groove. The moldable component 21 and the moldable component 31 each have at least one first groove 211 and 311, respectively. The first grooves 211 and 311 include a front wall 2111 and a rear wall 2112, with the distance between the front wall 2111 and the rear wall 2112 being at least partially variable. The distance between the two walls is between 0.1 to 20 mm, as shown by d1 in FIGS. 9 and 12. The projected area of the first grooves 211 and 311 on the horizontal plane occupies 10 to 90% of the projected area of the moldable component 21 and the moldable component 31 on the horizontal plane. This design considers that different teeth have different sizes. For example, the incisor portion is typically narrower and thinner, suitable for cutting and tearing food, while the molar portion is generally wider and thicker, better suited for chewing and grinding food. Additionally, there are differences between the upper and lower dental arches, with the upper dental arch's incisor portion usually being longer and larger than that of the lower dental arch. Therefore, as shown in FIGS. 9 to 12, the distance between the front wall 2111 and the rear wall 2112 of the first groove is adjusted accordingly. The width in the middle of the first grooves 211 and 311 (incisor position, as shown in FIG. 9) is smaller than the width on the sides (molar position, as shown in FIG. 12), and the height in the middle of the first grooves 211 and 311 (incisor position, as shown in FIG. 9) is greater than the height on the sides (molar position, as shown in FIG. 12). The first grooves 211 and 311 also include a bottom wall 2113, with the vertical distance between the bottom wall 2113 and the frames 22 and 32 between 1 to 15 mm, as shown by d3 in FIGS. 9 and 12. Similarly, considering the different sizes of the user's teeth, the vertical distance between the bottom wall 2113 and the frames 22 and 32 is also adjusted accordingly. Specifically, the vertical distance between the middle of the first grooves 211 and 311 (incisor position, as shown in FIG. 9) and the frames 22 and 32 is greater than the vertical distance between the sides of the first grooves 211 and 311 (molar position, as shown in FIG. 12) and the frames 22 and 32. Preferably, the vertical distance between the middle of the first grooves 211 and 311 and the frames 22 and 32 is between 4 to 6 mm, while the vertical distance between the sides of the first grooves 211 and 311 and the frames 22 and 32 is between 1 to 3 mm.

Figure 13:
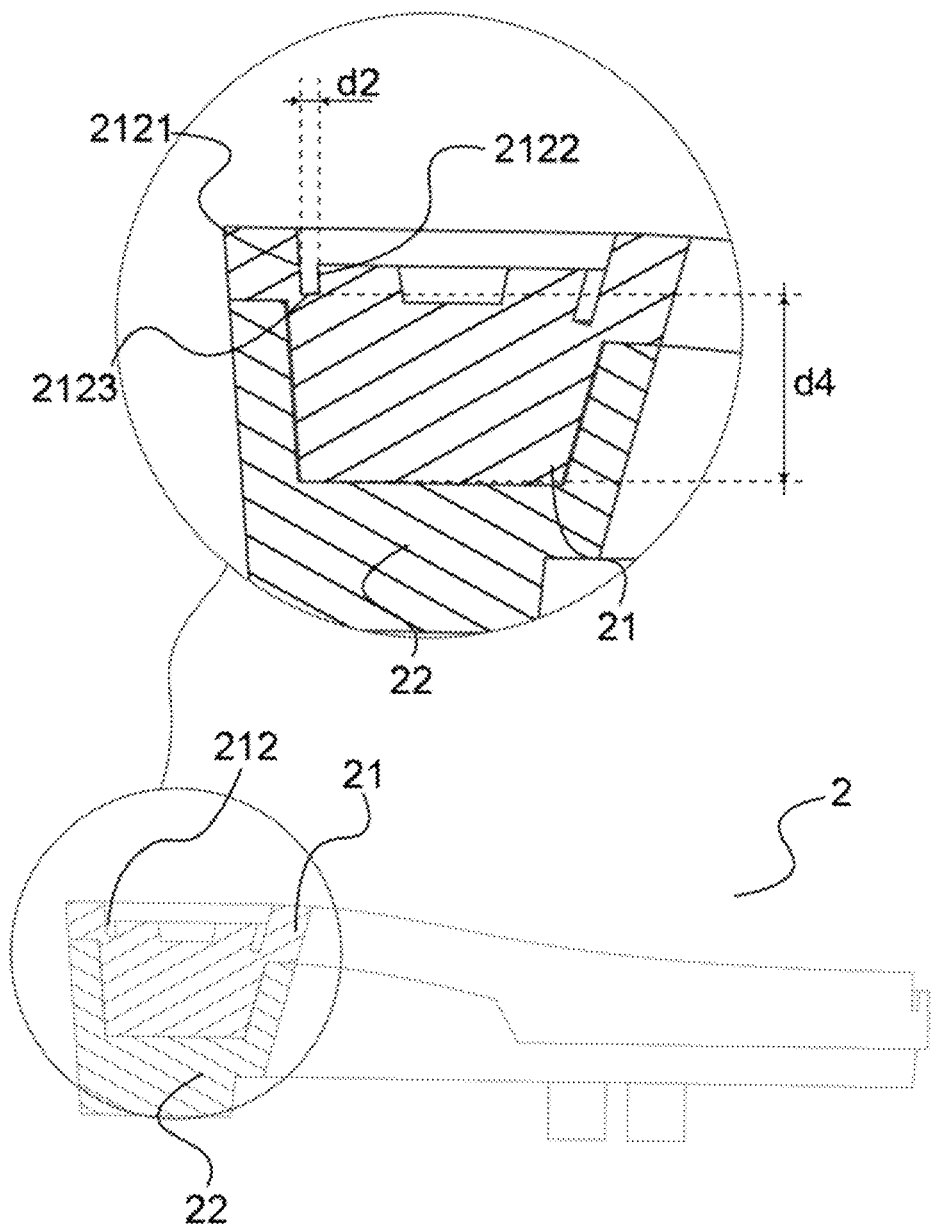
FIG. 13 is a partial cross-sectional view of the second groove in the upper tray assembly according to an embodiment of the present disclosure.
Figure 14A:
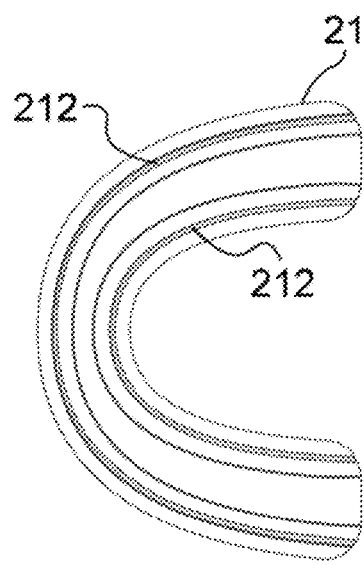
FIGS. 14A, 14B, 14C, and 14D are schematic diagrams of the distribution positions of the second groove of the moldable component according to an embodiment of the present disclosure.
Figure 14B:
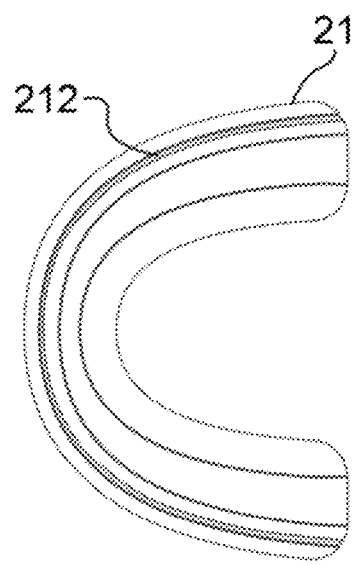
Figure 14C:
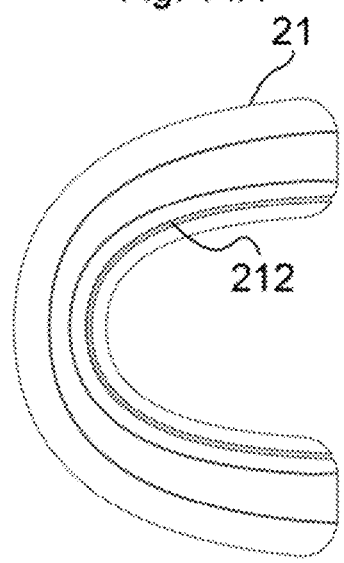
Figure 14D:
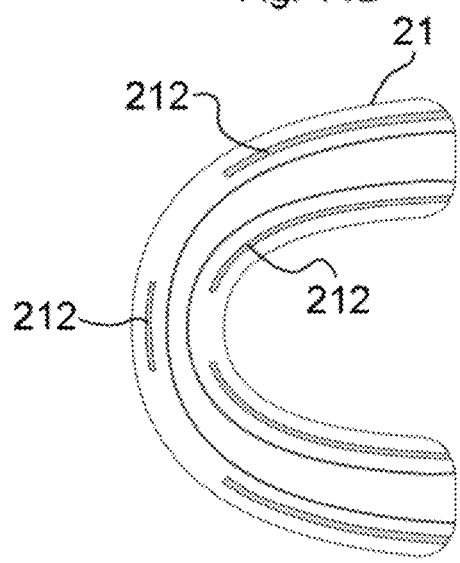

The moldable component 21 and the moldable component 31 each have at least one second groove 212 and 312, respectively, in any cross-section perpendicular to the horizontal plane. The second grooves 212 and 312 include a bottom wall 2123, a front wall 2121, and a rear wall 2122. The distance between the front wall 2121 and the rear wall 2122 is between 0.1 to 10 mm, as shown by d2 in FIG. 13. The vertical distance between the bottom wall 2123 and the frames 22 and 32 is between 0.5 to 15 mm, as shown by d4 in FIG. 13.

Due to the material characteristics and differences in tooth sizes, the second grooves 212 and 312 may be distributed in various positions. In other embodiments, as shown in FIGS. 14A, 14B, 14C, and 14D, the second grooves 212 and 312 can be distributed in front of and behind the first grooves 211 and 311, only in front of the first grooves 211 and 311, only behind the first grooves 211 and 311, or intermittently in different areas.

Additionally, the technical features of the above embodiments can be combined as needed to obtain an oral appliance 1 that includes all or some of the above technical features.

The moldable oral appliance of the present disclosure has at least the following beneficial effects:

(1) The moldable components are made of flexible thermoplastic material, providing excellent adaptability to the user's oral anatomy. The design of the moldable components covers most areas of the oral appliance, especially areas prone to cause abrasion in the mouth. This design effectively reduces friction between the oral appliance and oral tissues, making the user feel more comfortable during wear.

(2) The moldable components are configured to have a first groove and a second groove, aimed at providing superior molding effects during the heating and shaping process. During heating and shaping, the first groove accommodates the user's teeth. When the user bites to shape, the molding material of the front wall and rear wall of the first groove is compressed, causing excess material to move towards the side away from the teeth. Excess material may overflow the boundaries of the oral appliance, reducing its adaptability and wearing comfort. The second groove effectively solves this problem by being positioned in the path of the excess material. During compression, the excess material flows into the second groove, thereby controlling the flow of the molding material and preventing overflow during the shaping process. This design not only enhances the fit and comfort of the oral appliance but also reduces material waste, providing a higher quality user experience. Additionally, this design makes the production process of the oral appliance more economical and environmentally friendly.

(3) The moldable component includes a first groove, which is centrally located and configured to accommodate the user's teeth. Considering the variations in tooth sizes, the distance between the front and rear walls of the groove is adjusted accordingly. Incisors are typically narrower and thinner, suitable for cutting and tearing food, whereas molars are usually wider and thicker, better suited for chewing and grinding food. Additionally, there are differences between the upper and lower dental arches. Therefore, the dimensions of the first groove are set to fit different tooth shapes: the width in the middle (incisor position) is smaller than the width on the sides (molar position), and the height in the middle (incisor position) is greater than the height on the sides (molar position). This design helps the oral appliance better conform to the user's teeth, making the shaping process more straightforward and accurate for the user.

(4) The height of the moldable component varies at different positions, a design that takes into account the curved characteristics of the oral structure. Consequently, it includes height differences in its shape. Similarly, the overall shape of the tray assembly also considers the curved characteristics of the oral structure and is provided with height differences. As part of the tray assembly, the overall shape of the moldable component is adapted to the height differences of the tray assembly to ensure a better fit between the oral appliance and the user's teeth and oral structure, providing enhanced comfort and user experience. During biting, the moldable component can form a tighter contact with the teeth and oral structure, significantly improving the fit of the oral appliance. This design not only enhances the adaptability and fit of the oral appliance but also makes the user's bite molding process more convenient. Moreover, as this design improves the adaptability and fit of the oral appliance, it enhances the comfort for the user and thereby improves the treatment efficacy and user experience.

(5) The moldable component is made of a flexible material, which adapts more easily to the oral anatomy compared to the frame, reducing irritation and abrasion to the soft tissues of the mouth. Therefore, setting the projected area of the moldable component on the horizontal plane to be larger than that of the frame can decrease the contact pressure of the oral appliance on the soft tissues of the mouth, further reducing the risk of abrasion. Additionally, considering the variation in the distance from the inside of the lips to the back of the molar region among different users, the design of the oral appliance allows the user to trim the length to fit this distance. The soft moldable component enables users to easily trim and adjust the device length according to personal needs, thus enhancing comfort and personalized adaptability. Notably, since the projected area of the moldable component on the horizontal plane is larger than that of the frame, trimming does not affect the structure and function of the frame, ensuring the stability of the oral appliance.

The technical features of the above-described embodiments can be combined in any way. For the sake of brevity, not all possible combinations of the technical features of the above embodiments are described. However, any combination of these technical features that does not result in a contradiction should be considered within the scope of the present disclosure. It must be noted that as used herein and in the appended claims, the regular forms "a" "an" "the" include their plural equivalents, unless the context clearly dictates otherwise.

The above-described embodiments represent only a few ways to implement the disclosure. Although the descriptions are specific and detailed, they should not be construed as limiting the scope of the patent. It should be noted that those skilled in the art can make various modifications and improvements without departing from the concept of the disclosure, and these should be considered within the scope of the disclosure. Therefore, the scope of protection of the patent should be defined by the appended claims.

The invention claimed is:

1. A moldable oral appliance, comprising:
an upper tray assembly configured to be positioned on a user's upper dental arch;
a lower tray assembly configured to be positioned on the user's lower dental arch;
wherein the upper tray assembly includes an upper moldable component and an upper frame stacked in a vertical direction;
wherein the lower tray assembly includes a lower moldable component and a lower frame stacked in the vertical direction;
wherein the upper moldable component and the lower moldable component include a moldable material that is deformable when heated, and the upper frame and the lower frame do not deform when heated to a temperature required for deforming the upper moldable component and the lower moldable component;
wherein each of the upper moldable component and the lower moldable component has at least one preformed groove;
wherein the at least one preformed groove includes a first groove, the first groove having a front wall and a rear wall,
wherein the upper frame is U-shaped with two opposed posterior ends and the upper moldable component extends posteriorly beyond the two opposed posterior ends of the upper frame, and
wherein the lower frame is U-shaped with two opposed posterior ends and the lower moldable component extends posteriorly beyond the two opposed posterior ends of the lower frame.

2. The moldable oral appliance according to claim 1, wherein the upper moldable component and the lower moldable component are made of medical-grade moldable material.

3. The moldable oral appliance according to claim 1, wherein the upper moldable component and the lower moldable component do not damage their material or performance during a deformation process.

4. The moldable oral appliance according to claim 1, wherein the upper moldable component and the lower moldable component are configured to allow slight elastic deformation while maintaining their molded shape.

5. The moldable oral appliance according to claim 1, wherein a width in a middle of the first groove is less than a width at both sides of the first groove.

6. The moldable oral appliance according to claim 1, wherein a height in a middle of the first groove is greater than a height at both sides of the first groove.

7. A moldable oral appliance, comprising:
an upper tray assembly configured to be positioned on a user's upper dental arch;
a lower tray assembly configured to be positioned on the user's lower dental arch;
wherein the upper tray assembly includes an upper moldable component and an upper frame;
wherein the lower tray assembly includes a lower moldable component and a lower frame;
wherein the upper moldable component and the lower moldable component include a moldable material that is deformable when heated, and the upper frame and the lower frame do not deform when heated to a temperature required for deforming the upper moldable component and the lower moldable component;
wherein each of the upper moldable component and the lower moldable component has at least one first groove; and
wherein each of the upper moldable component and the lower moldable component has at least one second groove, and the at least one second groove is configured to prevent the upper moldable component and the lower moldable component from overflowing during a heating and molding process.

8. The moldable oral appliance according to claim 7, wherein the upper moldable component and the lower moldable component are at least partially made of a flexible thermoplastic material.

9. The moldable oral appliance according to claim 7, wherein the upper frame and the lower frame are at least partially made of a relatively rigid material compared to the upper moldable component and the lower moldable component to ensure structural stability and support of the oral appliance.

10. The moldable oral appliance according to claim 7, wherein the at least one first groove is configured to accommodate the user's teeth.

11. The moldable oral appliance according to claim 7, wherein the upper moldable component and the lower moldable component do not produce harmful substances or odors during the heating and molding process.

12. A moldable oral appliance, comprising:
an upper tray assembly configured to be positioned on a user's upper dental arch;
a lower tray assembly configured to be positioned on the user's lower dental arch;
wherein the upper tray assembly includes an upper moldable component and an upper frame stacked in a vertical direction;
wherein the lower tray assembly includes a lower moldable component and a lower frame stacked in the vertical direction;
wherein the upper moldable component and the lower moldable component include a moldable material that is deformable when heated, and the upper frame and the lower frame do not deform when heated to a temperature required for deforming the upper moldable component and the lower moldable component;
wherein each of the upper moldable component and the lower moldable component has at least one preformed groove;
wherein the upper frame is U-shaped with two opposed posterior ends and the upper moldable component extends posteriorly beyond the two opposed posterior ends of the upper frame, and wherein the lower frame is U-shaped with two opposed posterior ends and the lower moldable component extends posteriorly beyond the two opposed posterior ends of the lower frame.

13. The moldable oral appliance according to claim 12, wherein a height of at least a portion of the upper moldable component and the lower moldable component is between 0.5 mm and 30 mm.

14. The moldable oral appliance according to claim 12, wherein each of the upper frame and the lower frame has an outer wall, and the upper moldable component and the lower moldable component at least partially cover tops of outer walls on the upper frame and the lower frame.

15. The moldable oral appliance according to claim 14, wherein a height of the upper moldable component and the lower moldable component covering the tops of the outer walls on the upper frame and the lower frame is between 0 mm and 30 mm.

16. The moldable oral appliance according to claim 14, wherein a width of the upper moldable component and the lower moldable component covering the tops of the outer walls on the upper frame and the lower frame is between 0 mm and 10 mm.

17. A moldable oral appliance, comprising:
an upper tray assembly configured to be positioned on a user's upper dental arch;
a lower tray assembly configured to be positioned on the user's lower dental arch;
wherein the upper tray assembly includes an upper moldable component and an upper frame;
wherein the lower tray assembly includes a lower moldable component and a lower frame;
wherein the upper moldable component and the lower moldable component include a moldable material that is deformable when heated, and the upper frame and the lower frame do not deform when heated to a temperature required for deforming the upper moldable component and the lower moldable component;
wherein each of the upper moldable component and the lower moldable component has at least one first groove;
wherein each of the upper moldable component and the lower moldable component has at least one second groove; and
wherein the upper moldable component and the lower moldable component have one or more of the following characteristics:
(a) the at least one first groove has at least one bottom wall, and a vertical distance between the at least one bottom wall and the upper frame and/or the lower frame is between 1 mm to 15 mm;
(b) the at least one second groove has at least one bottom wall, and a vertical distance between the at least one bottom wall and the upper frame and/or the lower frame is between 0.5 mm to 15 mm; and
(c) a projected area of the at least one first groove on a horizontal plane occupies 10% to 90% of a projected area of the upper moldable component and/or the lower moldable component on the horizontal plane.

18. The moldable oral appliance according to claim 17, wherein the at least one second groove has a front wall and a rear wall, and a distance between the front wall and the rear wall is between 0.1 mm to 10 mm.

19. The moldable oral appliance according to claim 17, wherein a height of a middle portion of the upper moldable component and the lower moldable component is greater than a height at both ends of the upper moldable component and the lower moldable component.

20. The moldable oral appliance according to claim 17, wherein a shape of the upper tray assembly is configured to conform to an approximate arch shape of the user's upper dental arch.

21. The moldable oral appliance according to claim 18, wherein a shape of the lower tray assembly is configured to conform to an approximate arch shape of the user's lower dental arch.

* * * * *